Patented June 25, 1946

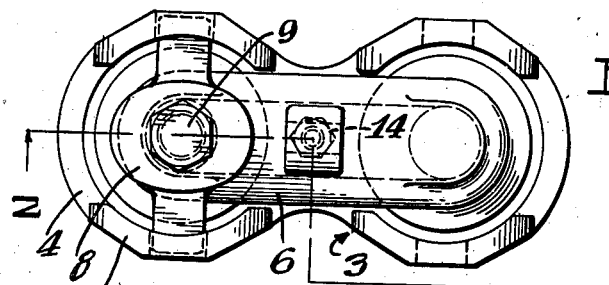
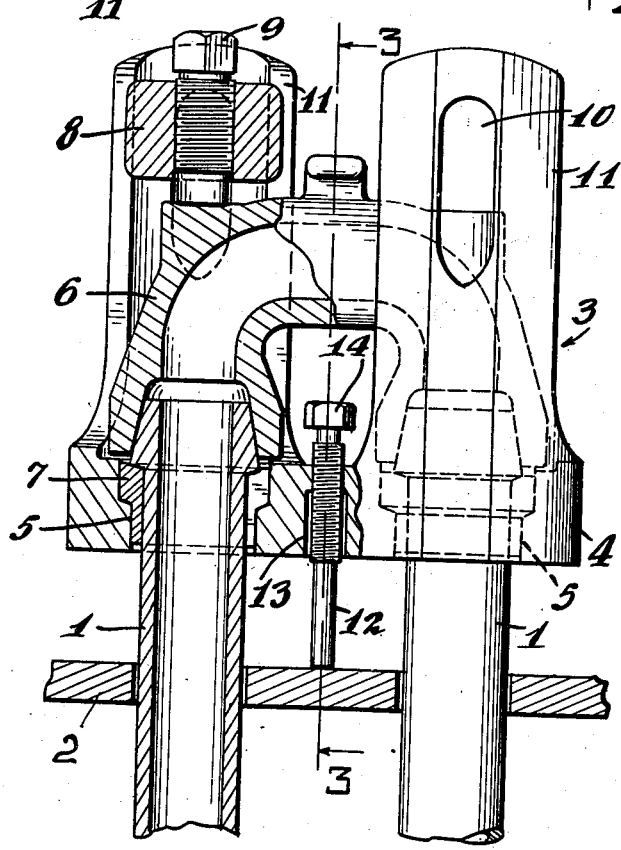
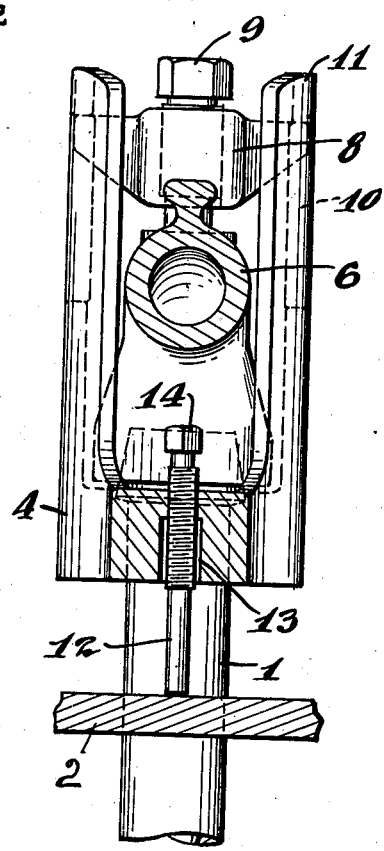

2,402,533

UNITED STATES PATENT OFFICE 2,402,533

RETURN BEND FITTING

Merritt Q. Colton, Lima, Ohio, assignor to The Ohio Steel Foundry Company, Lima, Ohio, a corporation of Ohio Application June 15, 1944, Serial No. 540,447

4 Claims. (Cl. 285—20)

This invention relates to improvements in return bend fittings for oil refineries, and particularly to the housing or yoke member thereof.

In the use of return bends of this character, the tubes connected thereby project outwardly at each end from the usual tube sheets of the still, and when the connecting return bend member of a fitting at either end is removed to render access to the tubes for cleaning, the tubes are not only liable to be pushed in relative to the tube sheets, but the housing member of the fitting is apt to slip back from the tube ends, thus permitting the customary split rings used therein around the tubes to fall out of the housing and the tubes to move out of proper alignment.

The primary object of the present invention is the provision of simple and efficient means in connection with a housing of a return bend fitting for coaction with the tube sheet of an oil refinery still assembly to hold the housing in proper position on a pair of connected tube ends when the return bend member has been removed and to prevent a falling out of the associated split ring joint members and an out-of-alignment movement of the tubes.

Other objects and advantages of the invention will be apparent from the following detailed description, and from the accompanying drawing, in which—

Figure 1 is a top plan view of a return bend fitting in which my invention has been incorporated, with one of the locking pieces removed; Fig. 2 is a section taken on the line 2—2 in Fig. 1, and Fig. 3 is a section taken on the line 3—3 in Fig. 2.

Referring now to the details of the embodiment of the invention illustrated in the drawing, 1, 1 designate a pair of tubes projecting outward at their ends through openings in a tube sheet 2 of an oil refining still, and 3 a U-bend fitting mounted on and connecting the two bends, as well understood in the art. The fitting 3 customarily comprises a housing or yoke 4 having a pair of spaced openings 5 through which the ends of a pair of tubes 1 are projected and in which they are inwardly shouldered, and 6 the U or return bend member of the fitting which connects the two bends and has close seating joints therewith. In the present instance, the tubes shoulder against respective split rings 7 which in turn shoulder in the yoke openings 5 to limit the outward movement of the yoke 4 on the tubes. The split form of the seating rings 7 permits them to be assembled in the yoke openings or to be removed or to fall therefrom when the yoke is slipped back a short distance from the tube ends. When the rings have been removed the shouldered tube ends may be moved inward through the yoke openings. Any suitable means may be provided for securing the U-bend fitting in place. In the form shown, the yoke member is provided with detachable lock pieces 8 having set screws 9 therein, said lock pieces being engageable beneath oppositely disposed flange parts 10 on upstanding walls 1 formed integral with the yoke, as shown.

The present invention consists in providing the yoke 4 of the return bend fitting with a stop-pin 12 which is engageable with the associated tube sheet 2 to prevent inward movement of the yoke on the tube ends when the return member 6 has been released therefrom, thus serving to retain the yoke and its split rings 7 in proper assembled relation on the tubes.

The stop-pin 12, in the present instance, is projected outwardly through an opening 13 in the yoke 4, relative to the fitting, centrally between the tube-receiving openings 5, and for the purpose of adjustment has threaded engagement with the wall of the opening 13, whereby a turning of the stop-pin will project its outer or tube sheet engaging end a greater or less distance from the yoke. The stop-pin has a wrench engaging head 14 at its inner end relative to the fitting in accessible position within the bend of the U member 6 to facilitate turning. It is preferable to thread the pin for only a portion of its length, as shown.

When the yoke 4 has been installed on a pair of tube ends with the split rings 7 in position therein and with the yoke pulled out to shoulder the rings against their seats in the yoke and the tube shoulders against the ring seats, the stop-pin 12 will be turned in against the tube sheet, thus serving to keep the tube ends in alignment and to prevent inward movement or slipping back of the yoke on the tube ends during cleaning, which would permit the split rings to fall out of the yoke openings. When the tubes expand under the heat of a run, the stop-pin 12 will be carried away from the tube sheet by the outward movement of the fitting with the tubes, and when the unit is off-stream and the tubes contract upon a cooling, the stop-pin will again bear against the tube sheet and retain the parts in assembled position and the tubes in alignment when the U-bend member has been disconnected from the tubes.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. In a return bend fitting including a yoke having means for receiving and outwardly shouldering against a pair of tube ends, adjustable stop means carried by the yoke and adapted to project outwardly therefrom relative to the fitting and to engage a tube sheet through which the tubes project to retain the yoke and tubes in assembled relation and hold the tube ends in alignment, said stop means moving outward away from the tube sheet with the fitting upon heat expansion of the tubes.

2. In a return bend fitting including a yoke having a pair of tube end-receiving openings therein and removable split rings in said openings shouldering outwardly against the tubes, a stop-pin adjustably carried by the yoke and operable to project from the yoke and engage an adjacent tube sheet through which the tubes are projected and cooperate therewith to hold the yoke and split rings in assembled relation on the tube ends and retain the tubes in alignment and to permit free movement of the yoke away from the tube sheet upon expansion of the tubes.

3. In a return bend fitting comprising a U-bend member for seating against and connecting a pair of transversely spaced tube ends, and means including a yoke adapted to slidingly fit on the tubes and to act on the U-bend member to hold it in tight seating engagement on the tube ends, together with a stop-pin threaded through the yoke between the engaged tubes lengthwise thereof and adapted to coact with a tube sheet from which the tubes project and retain the yoke in outwardly shouldered engagement with the tubes when the U-bend member is disconnected therefrom and also to permit free movement of the yoke away from the tube sheet upon expansion of the tubes.

4. In a return bend fitting for connecting the adjacent ends of a pair of tubes of an oil refining still at the outer side of the tube sheet thereof through which such tube ends project, said fitting including a yoke member slidingly mounted on the tubes and a return bend member connecting the tube ends, a stop adjustably projecting inwardly from the yoke member toward the tube sheet to coact therewith to hold the yoke member of the fitting in predetermined assembled position on the tubes when the return bend member is disconnected therefrom and moving outward from the tube sheet with the fitting when the tubes expand under heat conditions.

MERRITT Q. COLTON.